Apr. 10, 1923.

N. CORNFIELD

VEHICLE WHEEL

Filed Oct. 11, 1920

INVENTOR.
Noah Cornfield
BY
Whittemore Hulbert + Whittemore
ATTORNEYS

Patented Apr. 10, 1923.

1,451,253

UNITED STATES PATENT OFFICE.

NOAH CORNFIELD, OF DETROIT, MICHIGAN, ASSIGNOR TO ACME CUSHION WHEEL COMPANY, OF WILMINGTON, DELAWARE, A CORPORATION OF DELAWARE.

VEHICLE WHEEL.

Application filed October 11, 1920. Serial No. 416,134.

*To all whom it may concern:*

Be it known that I, NOAH CORNFIELD, a citizen of the United States of America, residing at Detroit, in the county of Wayne and State of Michigan, have invented certain new and useful Improvements in Vehicle Wheels, of which the following is a specification, reference being had therein to the accompanying drawings.

The invention relates to vehicle wheels and particularly to that type in which yieldable means are employed for taking care of the stresses. One object of the invention is to provide a wheel in which the yieldable means is carried from the wheel rim and is directly rotated from the axle by means of a spider block. Another object is the provision of means for positively lubricating the bearing surface of the support for the yieldable members. Other objects of the invention reside in the novel arrangements and combinations of parts as more fully hereinafter set forth.

Figure 1:
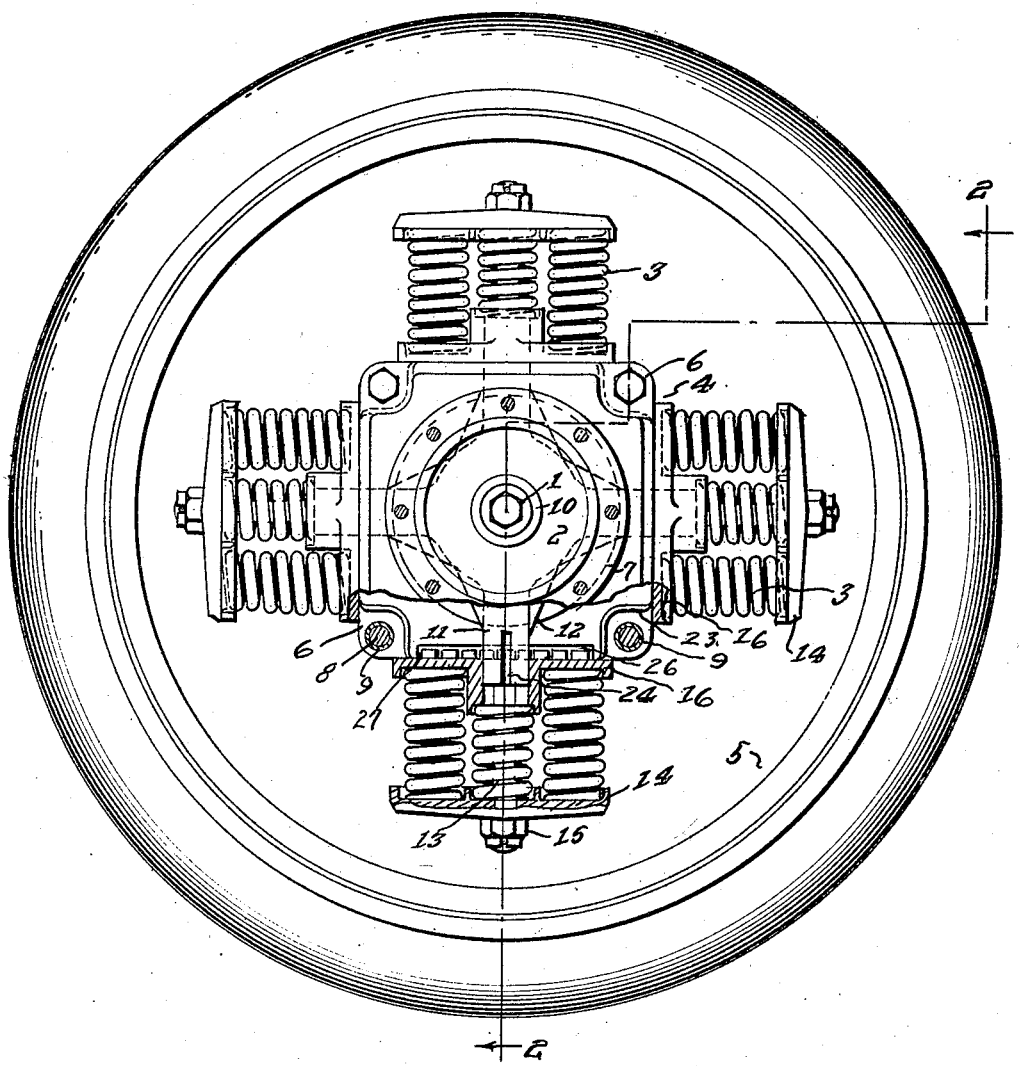
Figure 1 is a side elevation partly in section and with a side disk removed, of a wheel embodying my invention.
Figure 2:
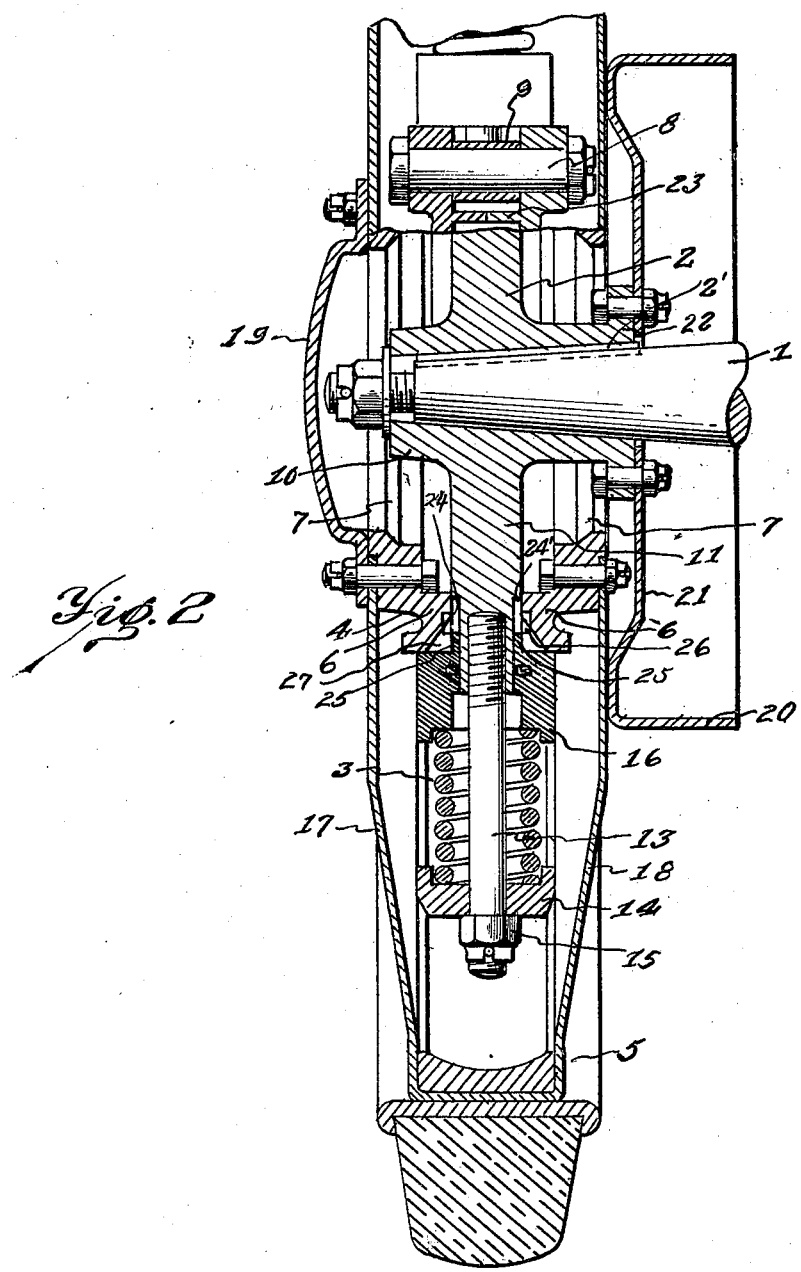
Figure 2 is a cross section on the line 2—2 of Figure 1.

1 is a vehicle axle, 2 a spider block mounted thereon, 3 the yieldable members secured to the spider block, and 4 the support for the yieldable members connected to the wheel rim 5. The support 4 comprises the polygonal spaced parallel plates 6 which have the central circular openings 7 therein, these plates being secured to each other at their corners by means of the bolts 8 and being spaced from each other by the spacers 9 surrounding the bolts. The spider block 2 has the hub portion 10 extending within the central opening 7 of the plates and spaced sufficiently from the walls of the openings to permit of all necessary movement of the spider block relative to the plates. 11 are arms extending radially outward from the hub portion 10 and slidably engaging between the plates 6, and 12 are re-inforcing webs extending between the arms and hub portion, the outer parts of these re-inforcing webs being adapted to slidably engage between the plates.

Threadedly engaging the outer ends of the arms 11 are the stud bolts 13 at the outer ends of which are sleeved the abutments 14 for the outer ends of the yieldable members 3, which in the present instance are coil springs. 15 are nuts for securing the outer abutments upon the studs. 16 are abutments for the inner ends of the coil springs, these abutments being sleeved around the outer ends of the arms 11 and slidably engaging the outer faces of the plates 6. 17 and 18 are respectively outer and inner side disks of the vehicle wheel connecting the wheel rim 5 to the plates 6. 19 is a hub cap secured to the outer plate 6 and outer disk 17 by the same bolts that secure the outer disk to the outer plate. 20 is a brake drum having the inwardly extending flange 21 which is bolted to the flange 22 at the inner end of the hub portion 10.

For the purpose of driving the wheel, the spider block 2 is nonrotatably mounted upon the axle 1 as by being secured thereto by means of a key 2' so that upon rotation of the axle 1, the spider block 2 is rotated, which rotates the inner spring abutments 16 yieldably forced against the outer faces of the plates 6 by means of the coil springs 3 and in turn rotating these plates and side disks and rim of the wheel. The coil springs are under tension at all times and are not subjected to any bending or torsional action.

For the purpose of positively lubricating the outer surfaces of the plates 6, the following construction is provided: 23 are closures at the corners of the spring support which cooperate with the inner spring abutments 16 to completely enclose the space between the support plates 6 and inside their peripheries. Specifically, each of these corner closures is formed by an integral flange upon one support plate and extending into engagement with the other, this flange having its end portions underlying the inner abutments. 24 are slots or recesses in the faces of the arms 11 bearing against the plates 6 of the spring support, these recesses extending longitudinally of the arms and to their outer ends. The inner ends of these recesses terminate at points beyond the central annular openings 7 in the plates when the parts are in their normal positions. The inner spring abutments 16 are provided with projections 25 fitting within the recesses 24 and forming shoulders which are stationary relative to the shoulders 24' formed by the inner ends of the recesses. 26 are channels or grooves in the bearing faces of the plates 6 and extending substantially parallel to the outer surfaces of these plates, these channels or grooves opening into channels or grooves 27 extending transversely thereof and leading to the outer faces of the plates. These latter channels or grooves terminate inside the outer faces of the inner spring abutments 16.

In operation, lubricant is contained within the hub portion of the wheel and normally occupies a position adjacent to the walls of the annular openings 7 when the wheel is being rotated. Upon movement of the spider block 2 relative to the support 4, the inner end of a recess 24 moves inwardly and permits lubricant to enter the same and upon reverse movement of the spider block relative to the support, this lubricant is trapped within the recess and is then forced into the channels or grooves 26 and 27 by means of the shoulder 24' thereby lubricating the outer faces of the plates 6.

What I claim as my invention is:

1. The combination with an axle, of a wheel, comprising a rim, a spider block keyed upon said axle and having outwardly extending arms, coil springs within said rim, support plates upon opposite sides of said block, disks connecting said plates to said rim, abutments for the inner ends of said springs slidably engaging said plates and sleeved upon said arms, and abutments for the outer ends of said springs connected to said arms.

2. The combination with a rim, of a spider block having a hub portion and outwardly-extending arms, yieldable members secured to said arms, abutments for the inner ends of said yieldable members, a pair of spaced support plates for the inner ends of said yieldable member carried by said rim, said plates having central openings surrounding and spaced from said hub portion and slidably engaging opposite sides of said arms, the inner sides of said plates having grooves therein extending to their peripheral faces and said arms having their bearing faces provided with recesses, and projections carried by said abutments engaging in said recesses.

3. The combination with a rim, of a spider block having a hub portion and outwardly-extending arms, coil springs secured at their outer ends to said arms, a pair of spaced support plates carried by said rim, said plates having central openings surrounding and spaced from said hub portion and slidably engaging opposite sides of said arms, the inner sides of said plates having grooves therein extending to their peripheral faces, abutments for the inner ends of said springs slidably engaging the peripheral faces of said plates and sleeved upon said arms, means for closing the space between said plates and abutments, recesses in the bearing faces of said arms terminating in the normal position of the parts outside the central openings in said plates, and means upon said abutments for closing said recesses.

In testimony whereof I affix my signature.

NOAH CORNFIELD